United States Patent
Khandelwal et al.

(10) Patent No.: US 9,824,458 B2
(45) Date of Patent: Nov. 21, 2017

(54) DYNAMICALLY SWITCHING BETWEEN LATE DEPTH TESTING AND CONSERVATIVE DEPTH TESTING

(71) Applicant: QUALCOMM Incorporated, San Diego, CA (US)

(72) Inventors: Shambhoo Khandelwal, Santa Clara, CA (US); Yang Xia, San Diego, CA (US); Xuefeng Tang, San Diego, CA (US); Jian Liang, San Diego, CA (US); Tao Wang, Sunnyvale, CA (US); Andrew Evan Gruber, Arlington, MA (US); Eric Demers, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 14/862,532

(22) Filed: Sep. 23, 2015

(65) Prior Publication Data

US 2017/0084043 A1 Mar. 23, 2017

(51) Int. Cl.
*G06T 7/20* (2017.01)
*G06T 1/60* (2006.01)
(Continued)

(52) U.S. Cl.
CPC ............. *G06T 7/20* (2013.01); *G06T 1/20* (2013.01); *G06T 1/60* (2013.01); *G06T 15/005* (2013.01);
(Continued)

(58) Field of Classification Search
CPC ..... G06T 15/005; G06T 15/40; G06T 15/405; G06T 15/80; G06T 1/20; G06T 1/60; G06T 7/20; G06T 2200/04; G06T 2200/28
(Continued)

(56) References Cited

U.S. PATENT DOCUMENTS 8,325,184 B2 12/2012 Jiao et al.
8,860,721 B2 10/2014 Gruber et al.
(Continued)

FOREIGN PATENT DOCUMENTS

EP 2037417 A2 3/2009
WO 2009036314 A2 3/2009

OTHER PUBLICATIONS

Anonymous: "Early Fragment Test—OpenGL Wiki", Sep. 1, 2015 (Sep. 1, 2015), pp. 1-2, XP055363119, khronos.org, Retrieved from the Internet: URL: https://www.khronos.org/opengl/wiki/Early_Fragment_Test.
(Continued)

*Primary Examiner* — King Poon
*Assistant Examiner* — Vincent Peren

(57) ABSTRACT

A graphics processing unit (GPU) may determine a workload of a fragment shader program that executes on the GPU. The GPU may compare the workload of the fragment shader program to a threshold. In response to determining that the workload of the fragment shader program is lower than a specified threshold, the fragment shader program may process one or more fragments without the GPU performing early depth testing of the one or more fragments before the processing by the fragment shader program. The GPU may perform, after processing by the fragment shader program, late depth testing of the one or more fragments to result in one or more non-occluded fragments. The GPU may write pixel values for the one or more non-occluded fragments into a frame buffer.

26 Claims, 7 Drawing Sheets

(51) Int. Cl.
*G06T 1/20* (2006.01)
*G06T 15/80* (2011.01)
*G06T 15/00* (2011.01)

(52) U.S. Cl.
CPC .......... *G06T 15/80* (2013.01); *G06T 2200/04* (2013.01); *G06T 2200/28* (2013.01)

(58) Field of Classification Search
USPC ........................................ 345/421, 422, 426
See application file for complete search history.

(56) References Cited

U.S. PATENT DOCUMENTS

| | | |
|---|---|---|
| 8,933,933 B2 | 1/2015 | French et al. |
| 9,076,265 B2 | 7/2015 | Fowler et al. |
| 2007/0257905 A1* | 11/2007 | French ................. G06T 15/005 345/419 |
| 2014/0118376 A1 | 5/2014 | Hakura et al. |
| 2014/0354654 A1 | 12/2014 | Heggelund et al. |
| 2015/0109313 A1 | 4/2015 | Heggelund et al. |
| 2016/0247249 A1* | 8/2016 | Harris ....................... G06T 9/00 |

OTHER PUBLICATIONS

International Search Report and Written Opinion—PCT/US2016/044060—ISA/EPO—dated Apr. 19, 2017—14 pp.

* cited by examiner

DYNAMICALLY SWITCHING BETWEEN LATE DEPTH TESTING AND CONSERVATIVE DEPTH TESTING

TECHNICAL FIELD

This disclosure relates to graphics processing, and more specifically to dynamically switching between late depth processing and conservative depth processing.

BACKGROUND

A graphics processing unit (GPU) of a computing device can execute a graphics processing pipeline that includes a plurality of stages for processing graphics commands to render a two-dimensional representation of a three-dimensional scene. A three-dimensional scene is typically made up of vertices, and the graphics processing pipeline includes a series of stages that are, for each vertex in the three-dimensional scene, executed in a fixed order to render a two-dimensional representation of the three-dimensional scene.

The graphics processing pipeline may include a chain of shader stages that executes to transform the vertices of the three-dimensional scene. Each of the shader stages consume data produced by previous stages and produces data for the next stages. The graphics processing pipeline may include a rasterization stage that rasterizes primitives into fragments. The graphics processing pipeline may also include a fragment shader stage subsequent to the rasterization stage that performs fragment shading of the fragments generated by the rasterization stage.

SUMMARY

In general, this disclosure describes techniques for determining, on a per-transaction basis, whether to perform conservative depth testing or late depth testing for a set of fragments generated by the rasterization stage of the graphics processing pipeline.

In one example of the disclosure, a method for graphics processing may include determining, by a graphics processing unit (GPU), a workload of a fragment shader program that executes on the GPU. The method may further include comparing, by the GPU, the workload of the fragment shader program to a threshold. The method may further include in response to determining that the workload of the fragment shader program is lower than the threshold, processing, by the fragment shader program, one or more fragments without performing, by the GPU, early depth testing of the one or more fragments before the processing by the fragment shader program. The method may further include performing, by the GPU after processing by the fragment shader program, late depth testing of the one or more fragments to result in one or more non-occluded fragments. The method may further include writing, by the GPU, pixel values for the one or more non-occluded fragments into a frame buffer.

In another example of the disclosure, an apparatus for graphics processing may include memory that stores one or more fragments. The apparatus may further include a graphics processing unit (GPU) configured to: determine a workload of a fragment shader program that executes on the GPU; compare the workload of the fragment shader program to a threshold; in response to determining that the workload of the fragment shader program is lower than the threshold, process, by the fragment shader program, the one or more fragments without performing, by the GPU, early depth testing of the one or more fragments before the processing by the fragment shader program; perform, after processing by the fragment shader program, late depth testing of the one or more fragments to result in one or more non-occluded fragments; and write pixel values for the one or more non-occluded fragments into a frame buffer.

In another example of the disclosure, an apparatus for graphics for graphics processing may include means for determining a workload of a fragment shader program. The apparatus may further include means for comparing the workload of the fragment shader program to a threshold. The apparatus may further include means for, in response to determining that the workload of the fragment shader is lower than a specified threshold, processing one or more fragments without performing early depth testing of the one or more fragments before the processing by the fragment shader program. The apparatus may further include means for performing, after processing by the fragment shader program, late depth testing of the one or more fragments to result in one or more non-occluded fragments. The apparatus may further include means for writing pixel values for the one or more non-occluded fragments into a frame buffer.

In another example of the disclosure, a computer-readable storage medium may store instructions that, when executed, cause one or more programmable processors to: determine a workload of a fragment shader program that executes on the one or more programmable processors; compare the workload of the fragment shader program to a threshold; in response to determining that the workload of the fragment shader program is lower than the threshold, process, by the fragment shader program, one or more fragments without performing, by the one or more programmable processors, early depth testing of the one or more fragments before the processing by the fragment shader program; perform, after processing by the fragment shader program, late depth testing of the one or more fragments to result in one or more non-occluded fragments; and writing pixel values for the one or more non-occluded fragments into a frame buffer.

The details of one or more examples are set forth in the accompanying drawings and the description below. Other features, objects, and advantages will be apparent from the description and drawings, and from the claims.

DETAILED DESCRIPTION

Figure 1:
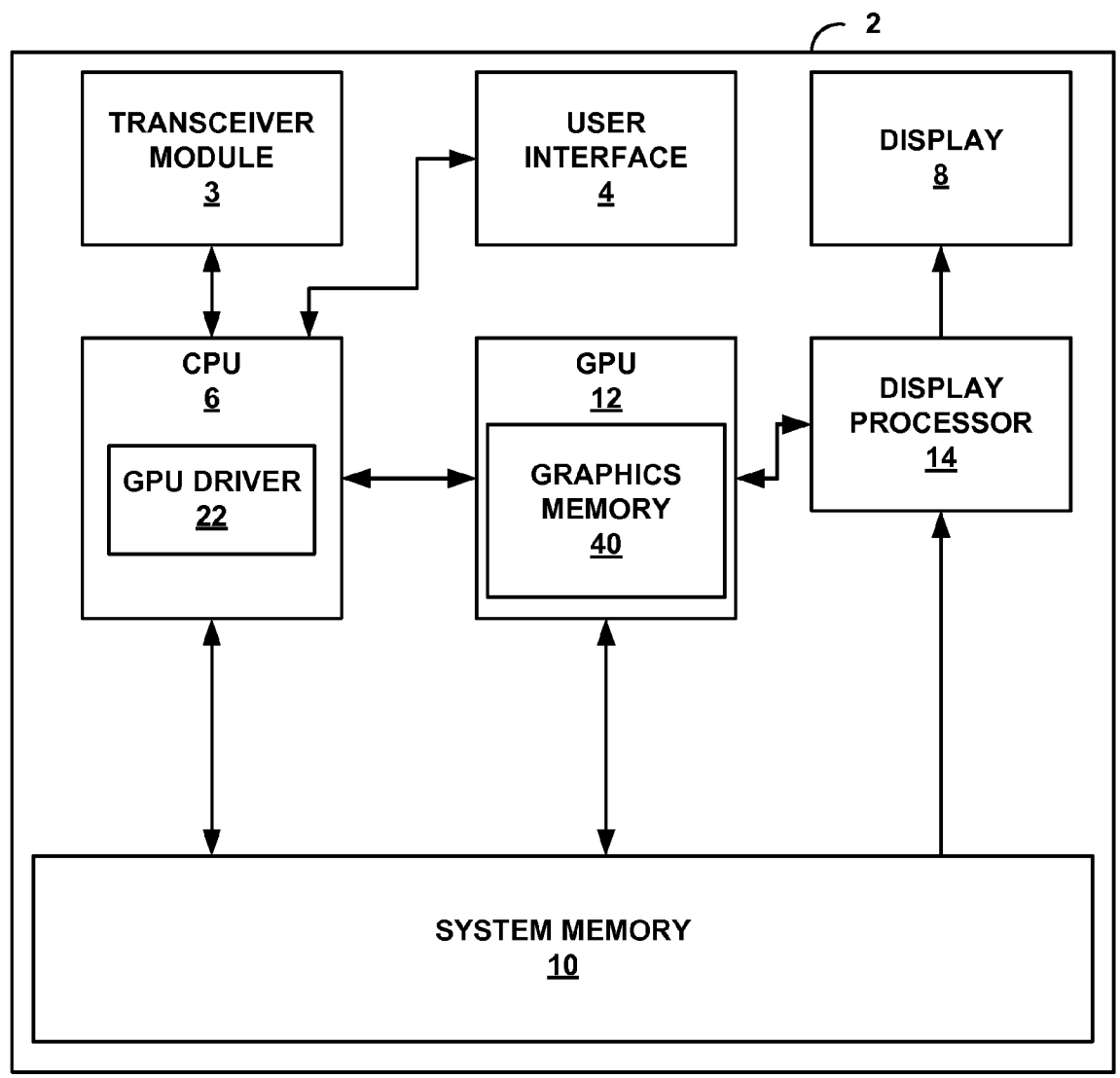
FIG. 1 is a block diagram illustrating an example computing device that may be configured to implement one or more aspects of this disclosure for dynamically switching between late depth processing and conservative depth processing.

In general, this disclosure describes techniques for determining, on a per-transaction basis, whether to perform conservative depth processing or late depth processing for a set of fragments generated by the rasterization stage of the graphics processing pipeline. The GPU performs depth processing of fragments to determine whether the fragments are occluded from view in the finally rendered scene and omits any potentially occluded fragments from further processing. In this way, the GPU may improve performance by not further processing fragments that will not be visible in the finally rendered scene.

The GPU may perform conservative depth processing for a set of fragments generated by the rasterizer stage by performing both early depth testing and late depth testing on the set of fragments. Alternatively, the GPU may perform late depth processing for the set of fragments by performing only late depth testing on the set of fragments. Because the fragment shader may potentially modify the depth values of fragments, the GPU performs late depth testing during both conservative depth processing and late depth processing of the set of fragments.

In some instances, if the fragment shader has a heavy workload, the GPU may improve its performance by performing conservative depth processing of fragments to potentially remove fragments via early depth testing from being processed by the fragment shader. In other instances, if the fragment shader has a light workload, the GPU may improve its performance by performing late depth processing of fragments instead of conservative depth processing, thereby omitting early depth testing of the fragments, because the fragment shader is able to efficiently process fragments due to its light workload. Because the workload of the fragment shader can change from one clock cycle to another, the GPU may decide whether to perform conservative depth processing or late depth processing on a per-transaction basis for fragments generated by the rasterization stage of the graphics processing pipeline.

The GPU may determine, for each transaction of a set of fragments generated by the rasterizer, whether to perform conservative depth processing or late depth processing for that set of fragments, and may switch between conservative depth processing or late depth processing on a per-transaction basis. In some examples, a transaction may be the set of fragments generated by the rasterizer in a single clock cycle. In other examples, a transaction may generally be a set of fragments generated by the rasterizer. The set of fragments in a single transaction may be fewer than all of the fragments that the rasterizer may generate in processing a single draw call by a software application.

The GPU may determine whether to perform conservative depth processing or late depth processing for a given set of fragments based on the workload of the fragment shader that performs the fragment shading of the set of fragments as well as the availability of depth testing hardware that performs the depth testing of the set of fragments. By performing conservative depth processing when a depth test unit of the GPU is available to perform depth testing, the GPU may discard fragments that are not visible in the finally rendered scene prior to performing fragment shading of those fragments, thereby minimizing the number of fragments on which GPU performs fragment shading. Further, by determining to perform late depth processing that does not include performing a depth test on fragments before those fragments are fragment shaded if the fragment shader program has a light workload, the GPU may minimize the wait time for fragments to be fragment shaded. In this way, the GPU may more quickly rendering fragments than will be visible in a finally rendered scene by determining, for a set of fragments, whether conservative depth processing or late depth processing provides greater performance in performing graphics processing operations.

FIG. 1 is a block diagram illustrating an example computing device that may be configured to implement one or more aspects of this disclosure. As shown in FIG. 1, device 2 may be a computing device including but not limited to video devices, media players, set-top boxes, wireless handsets such as mobile telephones and so-called smartphones, personal digital assistants (PDAs), desktop computers, laptop computers, gaming consoles, video conferencing units, tablet computing devices, and the like. In the example of FIG. 1, device 2 may include central processing unit (CPU) 6, system memory 10, and GPU 12. Device 2 may also include display processor 14, transceiver module 3, user interface 4, and display 8. Transceiver module 3 and display processor 14 may both be part of the same integrated circuit (IC) as CPU 6 and/or GPU 12, may both be external to the IC or ICs that include CPU 6 and/or GPU 12, or may be formed in the IC that is external to the IC that includes CPU 6 and/or GPU 12.

Device 2 may include additional modules or units not shown in FIG. 1 for purposes of clarity. For example, device 2 may include a speaker and a microphone, neither of which are shown in FIG. 1, to effectuate telephonic communications in examples where device 2 is a mobile wireless telephone, or a speaker where device 2 is a media player. Device 2 may also include a video camera. Furthermore, the various modules and units shown in device 2 may not be necessary in every example of device 2. For example, user interface 4 and display 8 may be external to device 2 in examples where device 2 is a desktop computer or other device that is equipped to interface with an external user interface or display.

Examples of user interface 4 include, but are not limited to, a trackball, a mouse, a keyboard, and other types of input devices. User interface 4 may also be a touch screen and may be incorporated as a part of a display 8. Transceiver module 3 may include circuitry to allow wireless or wired communication between computing device 2 and another device or a network. Transceiver module 3 may include modulators, demodulators, amplifiers and other such circuitry for wired or wireless communication.

CPU 6 may be a microprocessor, such as a central processing unit (CPU) configured to process instructions of a computer program for execution. CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. Additionally, CPU 6 may execute GPU driver 22 for controlling the operation of GPU 12. The user may provide input to computing device 2 via one or more input devices (not shown) such as a keyboard, a mouse, a microphone, a touch pad or another input device that is coupled to computing device 2 via user interface 4.

The software applications that execute on CPU 6 may include one or more graphics rendering instructions that instruct CPU 6 to cause the rendering of graphics data to display 8. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 (e.g., through GPU driver 22) to cause GPU 12 to perform some or all of the rendering of the graphics data. In some examples, the graphics data to be rendered may include a list of graphics primitives, e.g., points, lines, triangles, quadrilaterals, triangle strips, etc.

GPU 12 may be configured to perform graphics operations to render one or more graphics primitives to display 8. Thus, when one of the software applications executing on CPU 6 requires graphics processing, CPU 6 may provide graphics commands and graphics data to GPU 12 for rendering to display 8. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements, such as shader units, that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 8 more quickly than drawing the scenes directly to display 8 using CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. CPU 6 and GPU 12 may also be part of a single package, such as a system on chip (SoC). GPU 12 may include one or more processors, such as one or more microprocessors, application specific integrated circuits (ASICs), field programmable gate arrays (FPGAs), digital signal processors (DSPs), or other equivalent integrated or discrete logic circuitry. GPU 12 may also include one or more processor cores, so that GPU 12 may be referred to as a multi-core processor.

GPU 12 may be directly coupled to graphics memory 40. Thus, GPU 12 may read data from and write data to graphics memory 40 without using a bus. In other words, GPU 12 may process data locally using a local storage, instead of off-chip memory. Such graphics memory 40 may be referred to as on-chip memory. This allows GPU 12 to operate in a more efficient manner by eliminating the need of GPU 12 to read and write data via a bus, which may experience heavy bus traffic. In some instances, however, GPU 12 may not include a separate memory, but instead utilize system memory 10 via a bus. Graphics memory 40 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

In some examples, GPU 12 may store a fully formed image in system memory 10. Display processor 14 may retrieve the image from system memory 10 and output values that cause the pixels of display 8 to illuminate to display the image. Display 8 may be the display of computing device 2 that displays the image content generated by GPU 12. Display 8 may be a liquid crystal display (LCD), an organic light emitting diode display (OLED), a cathode ray tube (CRT) display, a plasma display, or another type of display device.

In accordance with aspects of the present disclosure, GPU 12 may determine the workload of a fragment shader that executes on GPU 12. In response to determining that the workload of the fragment shader is lower than a specified threshold, the fragment shader may process the one or more fragments without GPU 12 performing depth testing of the one or more fragments prior to the fragment shader processing the one or more fragments.

Figure 2:
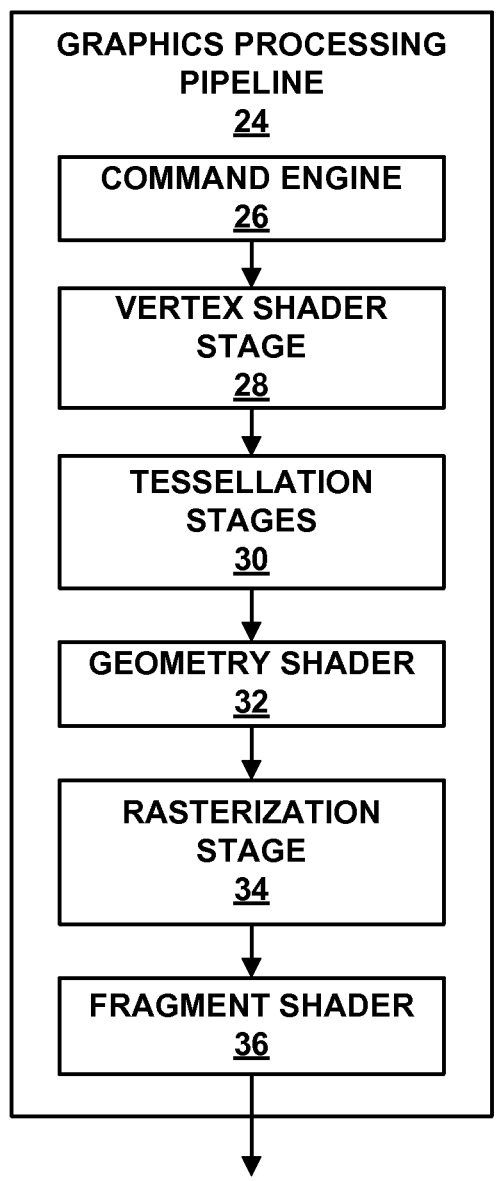
FIG. 2 is a block diagram illustrating an example graphics processing pipeline that may be performed by a GPU to create a two-dimensional representation of a three-dimensional scene.

FIG. 2 is a block diagram illustrating an example graphics processing pipeline 24 that may be performed by GPU 12 to create a two-dimensional representation of a three-dimensional scene. Graphics processing pipeline 24 may include a plurality of graphics processing stages that operate together to execute graphics processing commands. As shown in FIG. 2, graphics processing pipeline 24 may include command engine 26, vertex shader stage 28, tessellation stages 30, geometry processing stage 32, rasterization stage 34, and fragment shader stage 36. Each of the components in graphics processing pipeline 24 may be implemented as fixed-function components, programmable components (e.g., as part of a shader program executing on a programmable shader unit), or as a combination of fixed-function and programmable components.

GPU 12 may be configured to receive one or more graphics processing commands from CPU 6, via GPU driver 22, and to execute the graphics processing commands via graphics processing pipeline 24 to generate displayable graphics images. As discussed above, graphics processing pipeline 24 includes a plurality of stages that operate together to execute graphics processing commands. It should be noted, however, that such stages need not necessarily be implemented in separate hardware blocks. For example, portions of vertex shader stage 28, tessellation stages 30, geometry processing stage 32, rasterization stage 34, and fragment shader stage 36 may be implemented as part of a unified shader unit.

Command engine 26 may receive graphics processing commands and configure the remaining processing stages within graphics processing pipeline 24 to perform various operations for carrying out the graphics processing commands. The graphics processing commands may include, for example, drawing commands and graphics state commands. The drawing commands may include vertex specification commands that specify positional coordinates for one or more vertices and, in some instances, other attribute values associated with each of the vertices, such as, e.g., color coordinates, normal vectors, texture coordinates and fog coordinates. The graphics state commands may include primitive type commands, transformation commands, lighting commands, etc. The primitive type commands may specify the type of primitive to be rendered and/or how the vertices are combined to form a primitive. The transformation commands may specify the types of transformations to perform on the vertices. The lighting commands may specify the type, direction and/or placement of different lights within a graphics scene. Command engine 26 may cause geometry processing stage 32 to perform geometry processing with respect to vertices and/or primitives associated with one or more received commands.

Vertex shader stage 28 may process the received vertex data and attributes. For example, vertex shader stage 28 may perform per-vertex processing such as transformations, skinning, vertex displacement, and calculating per-vertex material attributes. In some examples, vertex shader stage 28 may generate texture coordinates, vertex color, vertex lighting, fog factors, and the like. Vertex shader stage 28 generally takes a single input vertex and outputs a single, processed output vertex.

Tessellation stages 30 may be a set of optional stages of graphics processing pipeline 24 that receive the vertices output by vertex shader stage 28 and that convert low-detail subdivision surfaces into higher-detail primitives, and tiles high-order surfaces into suitable surfaces (e.g., triangles) for rendering.

Geometry processing stage 32 may perform per-vertex operations and/or primitive setup operations on one or more vertices output by vertex shader stage 28 or tessellation stages 30 in order to generate primitive data for rasterization stage 34. Each vertex may be associated with a set of attributes, such as, e.g., positional coordinates, color values, a normal vector, and texture coordinates. Geometry processing stage 32 modifies one or more of these attributes according to various per-vertex operations. For example, geometry processing stage 32 may perform one or more transformations on vertex positional coordinates to produce modified vertex positional coordinates. Geometry processing stage 32 may, for example, apply one or more of a modeling transformation, a viewing transformation, a projection transformation, a ModelView transformation, a ModelViewProjection transformation, a viewport transformation and a depth range scaling transformation to the vertex positional coordinates to generate the modified vertex positional coordinates. In some instances, the vertex positional coordinates may be model space coordinates, and the modified vertex positional coordinates may be screen space coordinates. The screen space coordinates may be obtained after the application of the modeling, viewing, projection and viewport transformations. In some instances, geometry processing stage 32 may also perform per-vertex lighting operations on the vertices to generate modified color coordinates for the vertices. Geometry processing stage 32 may also perform other operations including, e.g., normal transformations, normal normalization operations, view volume clipping, homogenous division and/or backface culling operations.

Geometry processing stage 32 may produce primitive data that includes a set of one or more modified vertices that define a primitive to be rasterized as well as data that specifies how the vertices combine to form a primitive. Each of the modified vertices may include, for example, modified vertex positional coordinates and processed vertex attribute values associated with the vertex. The primitive data may collectively correspond to a primitive to be rasterized by further stages of graphics processing pipeline 24. Conceptually, each vertex may correspond to a corner of a primitive where two edges of the primitive meet. Geometry processing stage 32 may provide the primitive data to rasterization stage 34 for further processing.

In some examples, all or part of geometry processing stage 32 may be implemented by one or more shader programs executing on one or more shader processors of GPU 12. For example, geometry processing stage 32 may be implemented, in such examples, by a vertex shader, a geometry shader or any combination thereof. In other examples, geometry processing stage 32 may be implemented as a fixed-function hardware processing pipeline or as a combination of fixed-function hardware and one or more shader programs executing on one or more shader units.

Rasterization stage 34 is configured to receive, from geometry processing stage 32, primitive data that represents a primitive to be rasterized, and to rasterize the primitive to generate a plurality of source pixels that correspond to the rasterized primitive. In some examples, rasterization stage 34 may determine which screen pixel locations are covered by the primitive to be rasterized, and generate a source pixel for each screen pixel location determined to be covered by the primitive. Rasterization stage 34 may determine which screen pixel locations are covered by a primitive by using techniques known to those of skill in the art, such as, e.g., an edge-walking technique, evaluating edge equations, etc. Rasterization stage 34 may provide the resulting source pixels to fragment shader stage 36 for further processing.

The source pixels generated by rasterization stage 34 may correspond to a screen pixel location, e.g., a destination pixel, and be associated with one or more color attributes. All of the source pixels generated for a specific rasterized primitive may be said to be associated with the rasterized primitive. The pixels that are determined by rasterization stage 34 to be covered by a primitive may conceptually include pixels that represent the vertices of the primitive, pixels that represent the edges of the primitive and pixels that represent the interior of the primitive.

Fragment shader stage 36 is configured to receive a source pixel associated with a rasterized primitive, and to perform one or more per-pixel operations on the source pixel. Per-pixel operations that may be performed by fragment shader stage 36 include, e.g., alpha test, texture mapping, color computation, pixel shading, per-pixel lighting, fog processing, blending, a pixel ownership text, a source alpha test, a stencil test, a depth test, a scissors test and/or stippling operations. In addition, fragment shader stage 36 may execute one or more fragment shader programs to perform one or more per-pixel operations. The resulting data produced by fragment shader stage 36 may be referred to herein as destination pixel data and stored in the frame buffer. The destination pixel data may be associated with a destination pixel in the frame buffer that has the same display location as the source pixel that was processed. The destination pixel data may include data such as, e.g., color values, destination alpha values, depth values, etc.

In accordance with an aspect of the present disclosure, GPU 12 may determine the workload of a fragment shader that executes on GPU 12 to perform the functions of fragment shader stage 36. In response to determining that the workload of the fragment shader is lower than a specified threshold, the fragment shader may process the one or more fragments without GPU 12 performing depth testing of the one or more fragments prior to the fragment shader processing the one or more fragments.

Figure 3:
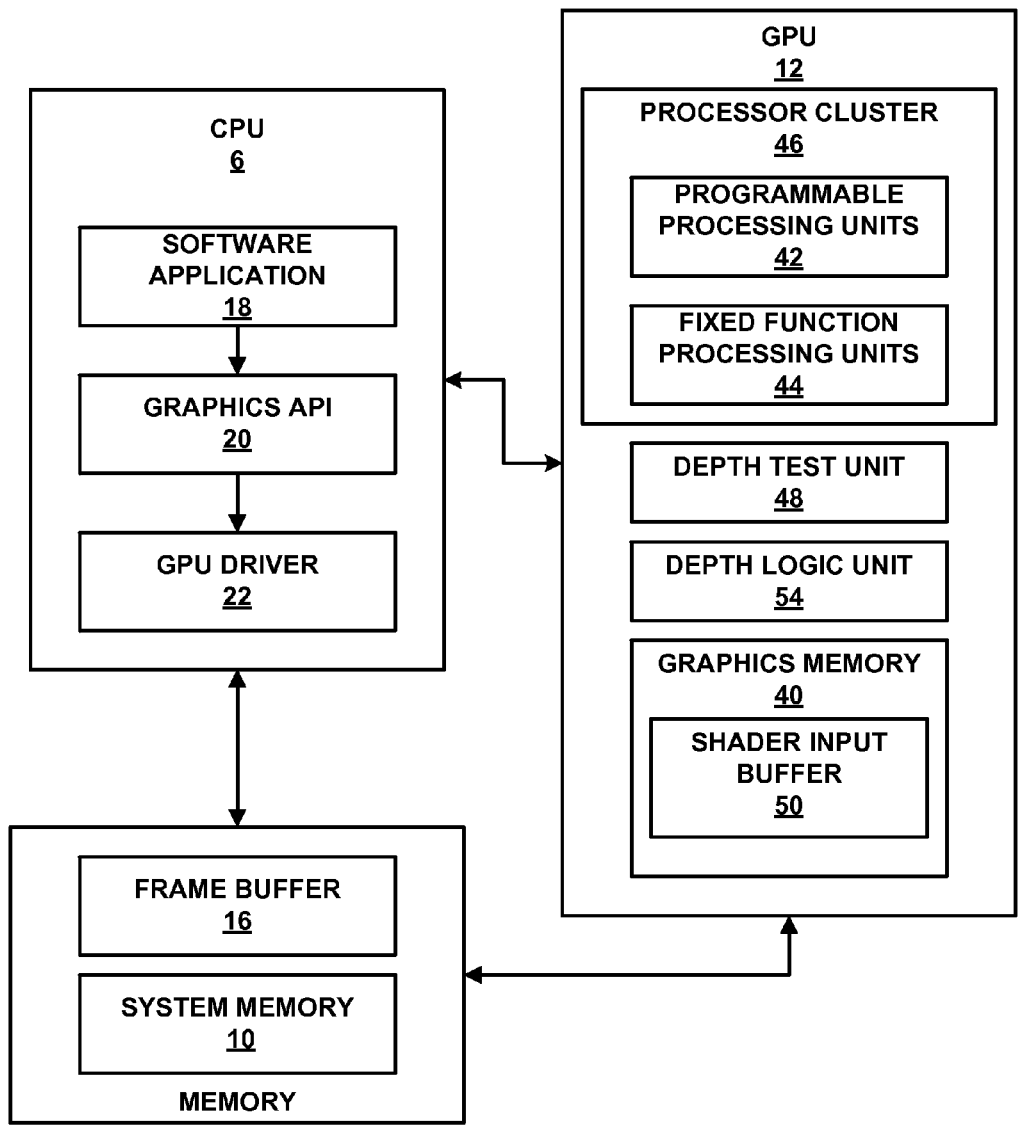
FIG. 3 is a block diagram illustrating example implementations of the CPU, the GPU, and the system memory of FIG. 1 in further detail.

FIG. 3 is a block diagram illustrating example implementations of CPU 6, GPU 12, and system memory 10 of FIG. 1 in further detail. As shown in FIG. 3, CPU 6 may include at least one software application 18, graphics API 20, and GPU driver 22, each of which may be one or more software applications or services that execute on CPU 6.

Memory available to CPU 6 and GPU 12 may include system memory 10 and frame buffer 16. Frame buffer 16 may be a part of system memory 10 or may be separate from system memory 10. Frame buffer 16 may store rendered image data.

Software application 18 may be any application that utilizes the functionality of GPU 12. For example, software application 18 may be a GUI application, an operating system, a portable mapping application, a computer-aided design program for engineering or artistic applications, a video game application, or another type of software application that uses 2D or 3D graphics.

Software application 18 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 18 may invoke GPU driver 22, via graphics API 20, to issue one or more commands to GPU 12 for rendering one or more graphics primitives into displayable graphics images. For example, software application 18 may invoke GPU driver 22, via graphics API 20, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like. Based on the instructions issued by software application 18 to GPU driver 22, GPU driver 22 may formulate one or more commands that specify one or more operations for GPU 12 to perform in order to render the primitive. When GPU 12 receives a command from CPU 6, processor cluster 46 may execute graphics processing pipeline 24 to decode the command and configures graphics processing pipeline 24 to perform the operation specified in the command. For example, command engine 26 in graphics processing pipeline 24 may read primitive data and assemble the data into primitives for use by the other graphics pipeline stages in graphics processing pipeline 24. After performing the specified operations, graphics processing pipeline 24 outputs the rendered data to frame buffer 16 associated with a display device.

Frame buffer 16 stores destination pixels for GPU 12. Each destination pixel may be associated with a unique screen pixel location. In some examples, frame buffer 16 may store color components and a destination alpha value for each destination pixel. For example, frame buffer 16 may store Red, Green, Blue, Alpha (RGBA) components for each pixel where the "RGB" components correspond to color values and the "A" component corresponds to a destination alpha value. Frame buffer 16 may also store depth values for each destination pixel. Although frame buffer 16 and system memory 10 are illustrated as being separate memory units, in other examples, frame buffer 16 may be part of system memory 10.

Processor cluster 46 may include one or more programmable processing units 42 and/or one or more fixed function processing units 44. Programmable processing units 42 may include, for example, programmable shader units that are configured to execute one or more shader programs that are downloaded onto GPU 12 from CPU 6. In some examples, programmable processing units 42 may be referred to as "shader processors" or "unified shaders," and may perform geometry, vertex, pixel, or other shading operations to render graphics. The shader units may each include one or more components for fetching and decoding operations, one or more ALUs for carrying out arithmetic calculations, one or more memories, caches, and registers.

A shader program, in some examples, may be a compiled version of a program written in a high-level shading language, such as, e.g., an OpenGL Shading Language (GLSL), a High Level Shading Language (HLSL), a C for Graphics (Cg) shading language, etc. In some examples, programmable processing units 42 may include a plurality of processing units that are configured to operate in parallel, e.g., an SIMD pipeline. Programmable processing units 42 may have a program memory that stores shader program instructions and an execution state register, e.g., a program counter register that indicates the current instruction in the program memory being executed or the next instruction to be fetched. Programmable processing units 42 in processor cluster 46 may include, for example, vertex shader units, fragment shader units, geometry shader units, hull shader units, domain shader units, compute shader units, and/or unified shader units.

GPU 12 may designate programmable processing units 42 to perform a variety of shading operations such as vertex shading, hull shading, domain shading, geometry shading, fragment shading, and the like by sending commands to programmable processing units 42 to execute one or more of a vertex shader stage 28, tessellation stages 30, a geometry processing stage 32, rasterization stage 34, and a fragment shader stage 36 in graphics processing pipeline 24. In some examples, GPU driver 22 may cause a compiler executing on CPU 6 to compile one or more shader programs, and to download the compiled shader programs onto programmable processing units 42 contained within GPU 12. The shader programs may be written in a high level shading language, such as, e.g., an OpenGL Shading Language (GLSL), a High Level Shading Language (HLSL), a C for Graphics (Cg) shading language, an OpenCL C kernel, etc. The compiled shader programs may include one or more instructions that control the operation of programmable processing units 42 within GPU 12. For example, the shader programs may include vertex shader programs that may be executed by programmable processing units 42 to perform the functions of vertex shader stage 28, tessellation shader programs that may be executed by programmable processing units 42 to perform the functions of a tessellation stages 30, geometry shader programs that may be executed by programmable processing units 42 to perform the functions of geometry processing stage 32 and/or fragment shader programs that may be executed by programmable processing units 42 to perform the functions of fragment shader stage 36. A vertex shader program may control the execution of a programmable vertex shader unit or a unified shader unit, and include instructions that specify one or more per-vertex operations.

Processor cluster 46 may also include fixed function processing units 44. Fixed function processing units 44 may include hardware that is hard-wired to perform certain functions. Although fixed function processing units 44 may be configurable, via one or more control signals for example, to perform different functions, the fixed function hardware typically does not include a program memory that is capable of receiving user-compiled programs. In some examples, fixed function processing unit 44 in processor cluster 46 may include, for example, processing units that perform raster operations, such as, e.g., depth testing, scissors testing, alpha blending, etc. as to perform the functions of rasterization stage 34 of graphics processing pipeline 24.

Graphics memory 40 is on-chip storage or memory that physically integrated into the integrated circuit of GPU 12. Because graphics memory 40 is on-chip, GPU 12 may be able to read values from or write values to graphics memory 40 more quickly than reading values from or writing values to system memory 10 via a system bus. Graphics memory 40 may include shader input buffer 50 that is configured to store and queue fragments for processing by the fragment shader program that executes on programmable processing units 42 to perform the functions of fragment shader stage 36.

As discussed above, processor cluster 46 includes programmable processing units 42 and fixed function processing units 44 which may perform functions of the various stages of graphics processing pipeline 24. In one example, fixed function processing units 44 of processor cluster 46 may perform the functions of rasterization stage 34 to rasterize one or more primitives into a set of pixels. Programmable processing units 42 may execute a fragment shader to perform the functions of fragment shader stage 36 to process the set of pixels rasterized by fixed function processing units 44 performing the functions of rasterization stage 34.

Depth test unit 48 may include hardware and/or processing units that execute software that is configured to test the depth value of a fragment against the depth value stored in the depth buffer at that fragment's sample position. The depth buffer may be included, in some examples, in frame buffer 16. Such a test may be useful to determine whether the fragment is occluded behind other fragments and therefore will not be visible in the finally rendered scene. If depth test unit 48 determines, based on performing a depth test, that a fragment will be occluded from view in the finally rendered scene behind another fragment, then GPU 12 may discard the fragment and may cease further processing of the fragment.

In accordance with an aspect of the disclosure, depth logic unit 54 may include hardware and/or processing units that execute software that is configured to determine whether GPU 12 performs conservative depth testing or late depth testing for one or more fragments generated by GPU 12 performing rasterization stage 34 of graphics processing pipeline 24. GPU 12 may perform conservative depth testing for a set of one or more fragments generated from performing rasterization stage 34 by having depth test unit 48 perform a depth test for the set of one or more fragments both before GPU 12 executes a fragment shader to perform the functions of fragment shader stage 36 to process the set of one or more fragments (i.e., perform early depth testing) and after GPU 12 executes a fragment shader to perform the functions of fragment shader stage 36 to process the set of one or more fragments (i.e., perform late depth testing). In other words, in conservative depth processing, GPU 12 performs both an early depth test and a late depth test, where early and late are in relation to when the fragment shader performs fragment shading of the fragments. In contrast to conservative depth processing, GPU 12 may perform late depth processing for a set of one or more fragments generated from performing rasterization stage 34 by having depth test unit 48 perform a depth test for the set of one or more fragments only after GPU 12 executes a fragment shader to perform the functions of fragment shader stage 36 to process the set of one or more fragments (i.e., perform late depth testing).

Further, if depth logic unit 54 directs depth test unit 48 to perform early depth testing of a set of fragments as part of conservative depth processing, and if depth logic unit 54 discards one or more of the set of fragments because depth test unit 48 determines that those one or more fragments would be occluded from view in the finally rendered scene, the resulting set of fragments that are forwarded to the fragment shader for processing after depth test unit 48 performs the early depth testing would not include those one or more fragments discarded by depth test unit 48. Similarly, if depth logic unit 54 directs depth test unit 48 to perform late depth testing of a set of fragments as part of either conservative depth processing or late depth processing, and if depth test unit 48 discards one or more of the set of fragments because depth test unit 48 determines that those one or more fragments would be occluded from view in the finally rendered scene, the values of the resulting set of fragments that GPU 12 writes into frame buffer 16 after depth test unit 48 performs the early depth testing would not include those one or more fragments discarded by depth test unit 48.

Depth logic unit 54 may be able to make such a determination of whether GPU 12 performs conservative depth processing or late depth processing on a per-transaction basis. A transaction may be a set of one or more fragments generated in a given clock cycle by GPU 12 performing the functions of rasterization stage 34. In other examples, a transaction may be a set of one or more fragments that are fewer than the total number of fragments generated as a result of a draw call by software application 18. As such, depth logic unit 54 can make multiple decisions with regards to whether GPU 12 performs conservative depth processing or late depth processing in processing a single draw call. In some examples, a rasterizer of GPU 12 that performs the functions of rasterization stage 34 may generate one or more fragments, such as a 4×4 pixel tile, per transaction. Thus, for each set of one or more fragments generated by the rasterizer in a given clock cycle, depth logic unit 54 may determine whether the GPU 12 performs conservative depth processing or late depth processing for that set of one or more fragments. By making the determination on a per-transaction basis, depth logic unit 54 may make separate determinations of whether the GPU 12 performs conservative depth processing or late depth processing for each separate transaction (e.g., each separate 4×4 pixel tile generated by rasterization stage 34) of the rasterizer generating a set of one or more fragments.

Depth logic unit 54 may determine whether to perform conservative depth processing or late depth processing for a set of one or more fragments based at least in part on the workload of the fragment shader program that executes on programmable processing units 42 to perform the functions of fragment shader stage 36. If depth logic unit 54 determines the fragment shader program to be lightly loaded, depth logic unit 54 may cause GPU 12 to perform late depth processing for a set of one or more fragments by only performing late depth testing of the one or more fragments. On the other hand, if depth logic unit 54 determines that the fragment shader is heavily loaded, depth logic unit 54 may cause GPU 12 to perform conservative depth processing for the one or more fragments, or may cause GPU 12 to stall for a clock cycle the determination of whether to perform conservative depth processing or late depth processing on the one or more fragments for a clock cycle.

Depth logic unit 54 may determine the workload of the fragment shader program that executes on programmable processing units 42 to perform the functions of fragment shader stage 36 based at least in part on the status of shader input buffer 50 that queues fragments for processing by the fragment shader program. Depth logic unit 54 may determine the workload of the fragment shader program that executes on programmable processing units 42 to perform the functions of fragment shader stage 36 based at least in part on the amount of data stored in shader input buffer 50 in comparison to the capacity of shader input buffer 50. In one example, depth logic unit 54 may determine that the fragment shader program that executes on programmable processing units 42 to perform the functions of fragment shader stage 36 is lightly loaded if the amount of data stored in shader input buffer 50 is no more than half of the capacity of shader input buffer 50. Depth logic unit 54 may determine that the fragment shader program that executes on programmable processing units 42 to perform the functions of fragment shader stage 36 is heavily loaded if the amount of data stored in shader input buffer 50 is more than half of the capacity of shader input buffer 50.

In other examples, the ratio between the amount of data stored in shader input buffer 50 and the capacity of shader input buffer 50 that make up the threshold between whether the fragment shader program is lightly loaded or heavily loaded may differ. For example, in one example, the threshold between whether the fragment shader program is lightly loaded or heavily loaded may be 3/5, in that the fragment shader program may be lightly loaded if the amount of data stored in shader input buffer 50 is no more than 3/5 of the capacity of shader input buffer 50. In other examples, the ratio between the amount of data stored in shader input buffer 50 and the capacity of shader input buffer 50 that make up the threshold between whether the fragment shader program is lightly loaded or heavily loaded may differ and may be any other suitable threshold.

Depth logic unit 54 may also dynamically determine the threshold between whether the fragment shader program is lightly loaded or heavily loaded based on hysteresis. In other words, the threshold may depend on present and past inputs of shader input buffer 50. In one example, if depth logic unit 54 determines that shader input buffer 50 is less than 30% full, depth logic unit may determine the fragment shader program to be lightly loaded. Once shader input buffer 50 is less than 30% full, if shader input buffer 50 grows from less than 30% full to being more than 30% full across multiple clock cycles, depth logic unit 54 may continue to determine that the fragment shader program is lightly loaded until the amount of data stored in shader input buffer 50 grows to being more than 70% of the capacity of shader input buffer 50, at which point depth logic unit 54 may determine that the fragment shader program is heavily loaded. Once shader input buffer 50 is more than 70% full, depth logic unit 54 may continue to determine that the fragment shader program is heavily loaded until the amount of data stored in shader input buffer 50 is reduced to less than 30% of the capacity of shader input buffer 50, at which point depth logic unit 54 may determine that the fragment shader program is lightly loaded. In this way, depth logic unit 54 may dynamically set and change the threshold between whether the fragment shader program is lightly loaded or heavily loaded.

In some examples, shader input buffer 50 may comprise a plurality of buffers that buffer data for processing by the fragment shader program that execute on respective parallel shader processors of programmable processing units 42. Depth logic unit 54 may determine that the fragment shader program is lightly loaded if the ratio between the amount of data stored in the buffer versus the capacity of the buffer of at least one of the plurality of buffers is below a threshold. For example, if at least one of the buffers is no more than half full, depth logic unit 54 may determine that the fragment shader program is lightly loaded.

In other examples, the threshold between whether the fragment shader program is lightly or heavily loaded may be based on the amount of data stored in shader input buffer 50 without taking into account the capacity of shader input buffer 50. For example, if the amount of data stored in shader input buffer comprises one or more fragments, depth logic unit 54 may determine that the fragment shader program is heavily loaded. Conversely, if the shader input buffer is empty, depth logic unit 54 may determine that the fragment shader program is lightly loaded.

Depth logic unit 54 may also determine the workload of the fragment shader program based at least in part on determining the utilization of various components of GPU 12. Depth logic unit 54 may monitor the load and/or utilization of components of processor cluster 46, such as texture processors, shader processors, arithmetic logic units (ALUs), and the like, as well as the traffic of the memory bandwidth between the components of processor cluster 46 and caches and/or memories. Depth logic unit 54 may determine the workload of the fragment shader program based on the load and/or utilization of processor cluster 46 as well as memory traffic on a per-clock cycle basis or based on an average load and/or utilization over several clock cycles. In this way, depth logic unit 54 may determine the threshold between whether the fragment shader program is lightly or heavily loaded as a specific load and/or utilization of processor cluster 46 or a specific level of memory traffic measured instantaneously or an average temperature over several clock cycles. Depth logic unit 54 may also measure the temperature of the hardware components of processor cluster 46 to determine the processor load of processor cluster 46, and may determine the threshold between whether the fragment shader program is lightly or heavily loaded as a specific temperature measured instantaneously or an average temperature over several clock cycles.

Figure 4:
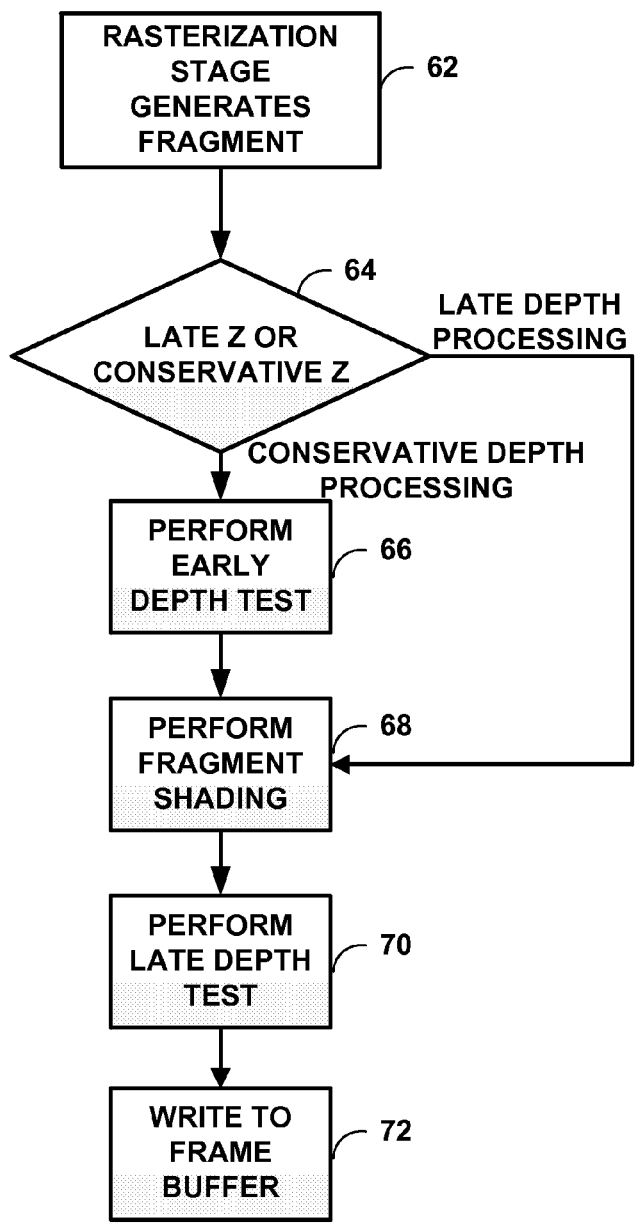
FIG. 4 is a flowchart illustrating an example process for dynamically switching between late depth processing and conservative depth processing.

FIG. 4 is a flowchart illustrating an example process for dynamically switching between late depth processing and conservative depth processing. As shown in FIG. 4, GPU 12 may perform the functions of rasterization stage 34 to generate one or more fragments for processing by a fragment shader that executes on GPU 12 to perform the functions of fragment shader stage 36 (62). In response to GPU 12, as a result of performing the functions of rasterization stage 34, outputting the one or more fragments, depth logic unit 54 may determine whether to perform conservative depth processing or late depth processing for the one or more fragments (64).

Depth logic unit 54 may make such a determination based at least in part on the workload of the fragment shader. Specifically, depth logic unit 54 may determine whether the workload of the fragment shader is higher than a specified threshold. If depth logic unit 54 determines that the workload of the fragment shader is higher than the specified threshold, depth logic unit 54 may cause GPU 12 to perform conservative depth processing for the one or more fragments. As part of performing conservative depth processing, depth test unit 48 may perform both early depth testing and late depth testing (66). Depth test unit 48 may discard any fragments that depth test unit 48 determines to be occluded from view in the finally rendered scene and may output the remaining one or more fragments for processing by the fragment shader. Because early depth testing performed by depth test unit 48 may discard one or more fragments that will not be processed by the fragment shader, depth logic unit 54 may decrease the load at the fragment shader stage 36, thereby improving the performance of the GPU by potentially providing fewer fragments for processing by the fragment shader.

In contrast, if depth logic unit 54 determines that the workload of the fragment shader is lower than the specified threshold, depth logic unit 54 may cause GPU 12 to perform late depth processing for the one or more fragments by providing the one or more fragments as input for processing by the fragment shader without depth test unit 48 performing early depth testing of the one or more fragments. In this case, because of the relatively lower workload of the fragment shader, the fragment shader may be able to process the fragments without decreasing the performance of GPU 12.

GPU 12 may execute a fragment shader to perform the functions of fragment shader stage 36 to process, in the case of conservative depth processing, the remaining one or more fragments outputted from depth test unit 48, or, in the case of late depth processing, the one or more fragments generated by rasterizer hardware that performs the functions of rasterization stage 34 (68). Depth test unit 48 may perform depth testing of one or more fragments outputted by the fragment shader (70). Depth test unit 48 may discard any fragments that depth test unit 48 determines to be occluded from view in the finally rendered scene and may write values for the remaining one or more fragments into frame buffer 16 (72).

In accordance with an aspect of the present disclosure, depth logic unit 54 may further determine whether to perform conservative depth processing or late depth processing for one or more fragments generated by the rasterizer of GPU 12 based at least in part on the availability of depth test unit 48 to perform depth testing of the one or more fragments. A single depth test unit 48 performs early depth testing, in the case of conservative depth processing, and late depth testing, in the case of both conservative depth processing and late depth processing. Thus, fragments outputted by the fragment shader that executes on programmable processing units 42 to perform the functions of fragment shader stage 36 as well as the fragment generated by rasterizer hardware that performs the functions of rasterization stage 34 may both be available at a given clock cycle as input for depth test unit 48 to perform depth testing.

Figure 5:
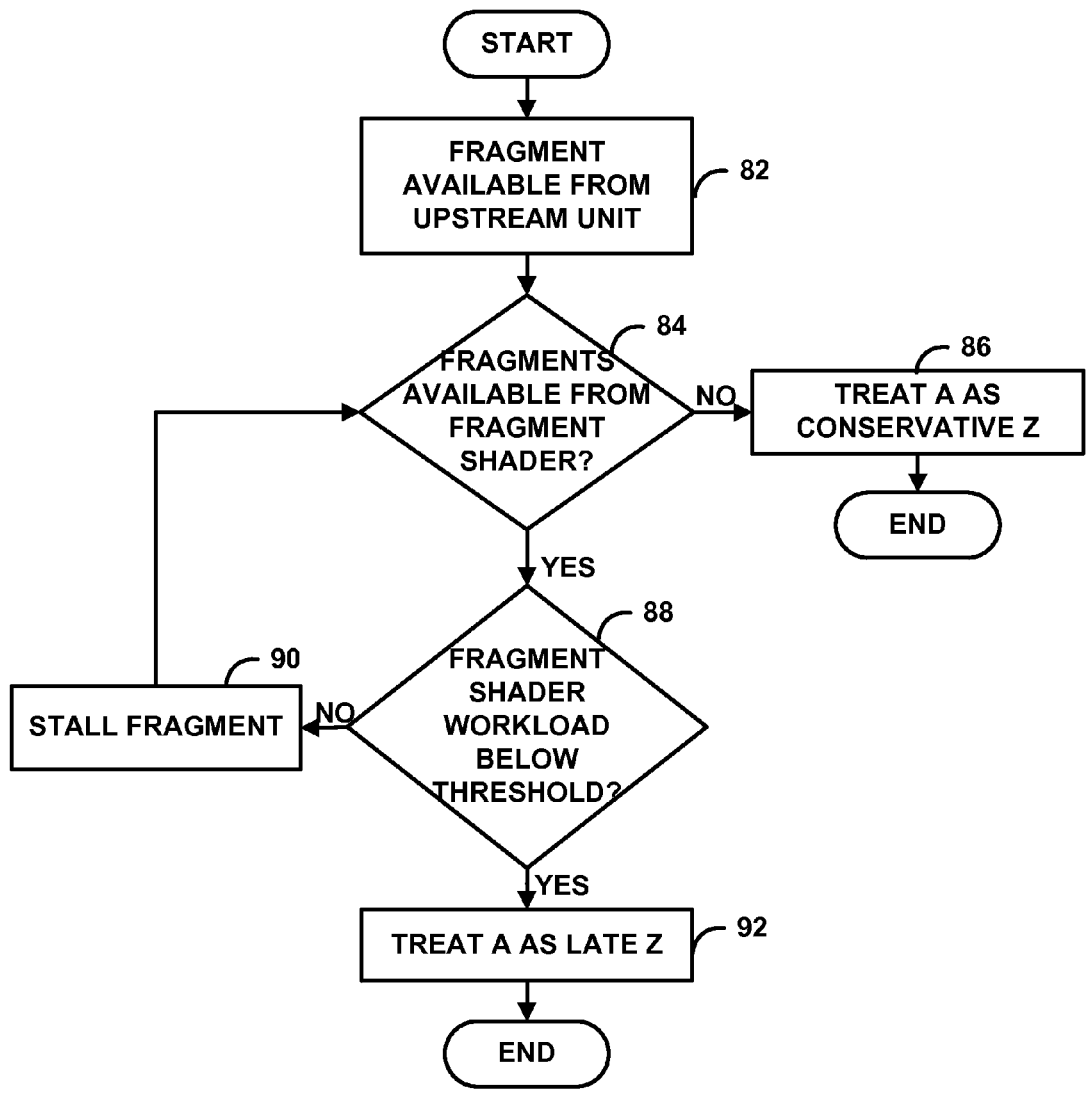
FIG. 5 is a flowchart illustrating an example process for dynamically switching between late depth processing and conservative depth processing.

FIG. 5 is a flowchart illustrating an example process for dynamically switching between late depth processing and conservative depth processing that is further based at least in part on the workload of depth test unit 48. As shown in FIG. 5, an upstream unit of GPU 12, such as the rasterizer (e.g., one or more hardware units of fixed function processing units 44) of GPU 12, may generate one or more fragments that are available (82).

In response to one or more fragments being available from the upstream unit, depth logic unit 54 may determine whether to perform conservative depth processing or late depth processing for the one or more fragments that are available based at least in part on the availability of depth test unit 48. Specifically, depth logic unit 54 may determine the availability of depth test unit 48 and may determine whether to perform conservative depth processing or late depth processing for the one or more fragments based at least on the availability of depth test unit 48 (84). As discussed above, the same depth test unit 48 may be utilized to perform depth testing of fragments both prior to (in the case of conservative depth processing) and after fragment shading (in the case of both late depth processing and conservative depth processing). Thus, in some instances, depth test unit 48 may be busy performing depth tests on one or more fragments that are outputted by the fragment shader and may not be available to perform depth tests on one or more fragments available from the upstream unit.

Depth logic unit 54 may determine whether the workload of depth test unit 48 is too high to perform a depth test on the one or more fragments available from the upstream unit based at least in part on whether fragments are available from the fragment shader for processing by depth logic unit 54 (84). Depth test unit 48 may prioritize the processing of fragments that are outputted by the fragment shader over the one or more fragments generated by the rasterizer. As such, if fragments outputted by the fragment shader are available to be processed by depth test unit 48, depth test unit 48 may perform depth testing of those fragments in lieu of performing depth testing of the one or more fragments generated by the rasterizer. On the other hand, if fragments outputted by the fragment shader are not available to be processed by depth test unit 48, depth test unit 48 may be available to perform depth testing on the one or more fragments generated by the rasterizer. Thus, if fragments outputted by the fragment shader are not available to be processed by depth test unit 48, depth logic unit 54 may perform conservative depth processing on the one or more fragments generated by the rasterizer (86). In other words, because depth test unit 48 is free to perform depth testing on the one or more fragments generated by the rasterizer, depth logic unit 54 may determine that GPU 12 performs conservative depth processing on the one or more fragments by directing depth test unit 48 to perform depth testing of the one or more fragments prior to the one or more fragments being processed by the fragment shader (i.e., early depth testing).

If fragments outputted by the fragment shader are available as input for depth test unit 48, depth test unit 48 may perform depth testing on those fragments outputted from the fragment shader in lieu of performing depth testing on the one or more fragments available from the upstream unit. Thus, depth logic unit 54 may determine to not perform conservative depth processing on the one or more fragments during the current clock cycle. Instead, in response to determining that fragments outputted by the fragment shader are available for depth test unit 48 to perform depth processing on those fragments, depth logic unit 54 may determine the workload of the fragment shader to determine whether the performance of processing the one more fragments is improved by performing late depth processing on the one or more fragments (88).

Specifically, depth logic unit 54 may determine whether the workload of the fragment shader is lower than a specified threshold. If the workload of the fragment shader is below the specified threshold, depth logic unit 54 may determine that processing of the one or more fragments is improved by the fragment shader processing the one or more fragments without depth test unit 48 performing depth testing on the one or more fragments prior to processing by the fragment shader. Thus, in response to depth logic unit 54 determining that the workload of the fragment shader is below the specified threshold, GPU 12 may perform late depth processing on the one or more fragments generated by the rasterizer, including processing, by the graphics shader, the one or more fragments generated by the rasterizer without depth test unit 48 performing depth testing of the one or more fragments prior to the fragment shader processing the one or more fragments.

If the workload of the fragment shader is higher than the specified threshold, depth logic unit 54 may determine that processing of the one or more fragments is negatively impacted by the fragment shader processing the one or more fragments during that clock cycle. In this case, GPU 12 may stall the one or more fragments for a clock cycle (90) and may re-determine whether to perform conservative depth processing or late depth processing at the subsequent clock cycle by re-determining whether depth logic unit 54 is available to process the one or more fragments (84).

Figure 6:
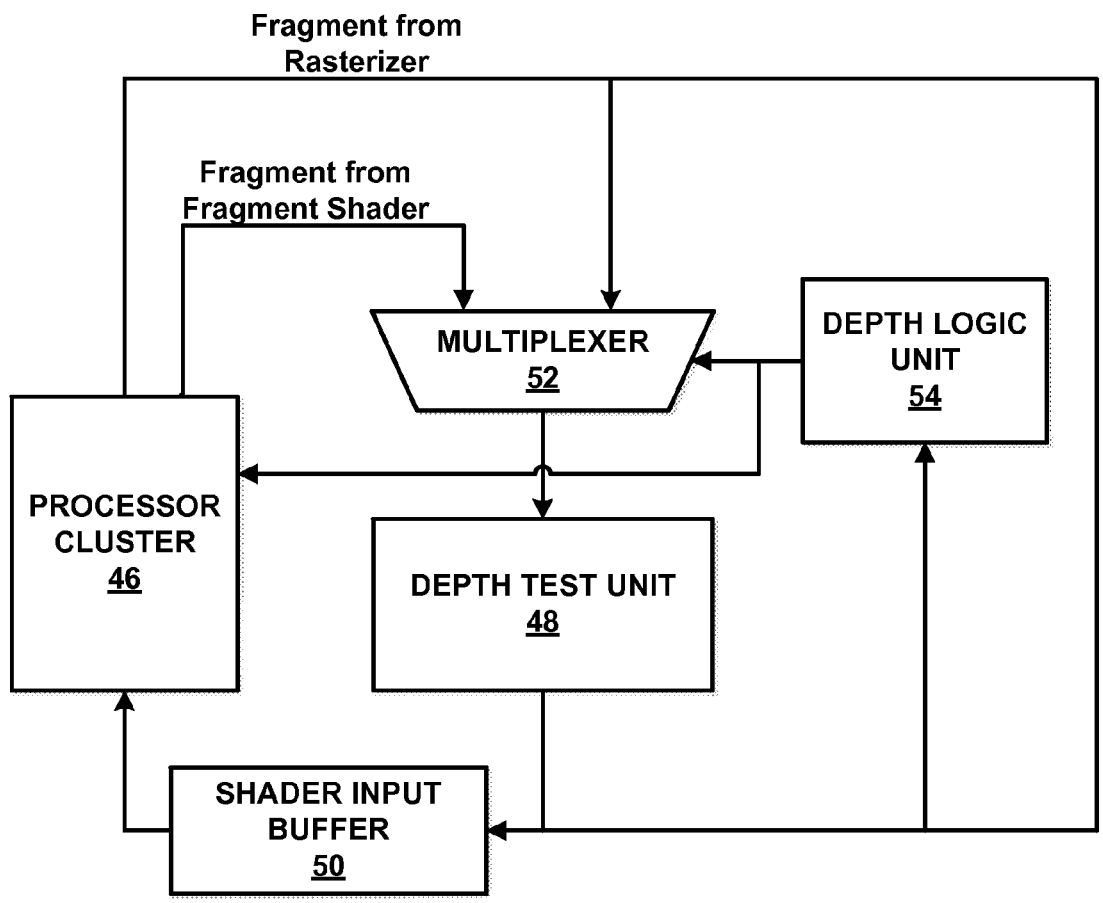
FIG. 6 is a block diagram illustrating hardware units of the GPU of FIG. 3 for dynamically switching between late depth processing and conservative depth processing in further detail.

The process at a subsequent cycle may follow the same flow as shown in FIG. 6. For example, if, at the subsequent clock cycle, depth logic unit 54 is still not available to perform depth testing of the one or more fragments, depth logic unit 54 may re-determine the workload of the fragment shader (88). If the workload of the fragment shader is lower than the specified threshold, depth logic unit 54 may cause GPU 12 to perform late depth processing of the one or more fragments, including processing, by the fragment shader, the one or more fragments without depth test unit 48 performing an early depth test of the one or more fragments (90).

FIG. 6 is a block diagram illustrating hardware units of the GPU 12 of FIG. 3 for dynamically switching between late depth processing and conservative depth processing in further detail. As shown in FIG. 6 depth logic unit 54 may select whether multiplexer 52 forwards a fragment outputted by the rasterizer or a fragment outputted by a fragment shader for processing by depth test unit 48. In this way, depth logic unit 54 determines whether conservative depth testing is performed on the fragment outputted by the rasterizer. As discussed above, depth logic unit 54 may determine whether a fragment outputted by the fragment shader is ready for processing by depth test unit 48 and, if so, may select that fragment to be processed by depth test unit 48. If a fragment outputted by the fragment shader is not ready for processing by depth test unit 48, depth logic unit 54 may instead select the fragment outputted by the rasterizer for processing by depth test unit 48.

Shader input buffer 50 may store fragments to be processed by the fragment shader that executes on processor cluster 46. In this way, shader input buffer 50 serves as a queue for fragments to be fragment shaded by the fragment shader. Depth logic unit 54 may determine the workload of the fragment shader that executes on processor cluster 46 based at least in part on the amount of data stored in shader input buffer 50, and more specifically, the amount of the data stored in shader input buffer 50 compared with the capacity of shader input buffer 50. If the amount of the data stored in shader input buffer 50 is less than or equal to a threshold, such as by taking up no more than half the capacity of shader input buffer 50, depth logic unit 54 may determine that the fragment shader is lightly loaded and may be able to take on the fragment outputted by the rasterizer at the current clock cycle to perform fragment shading. On the other hand, if the amount of data stored in shader input buffer is more than a threshold, such as by taking up more than half the capacity of shader input buffer 50, depth logic unit 54 may determine that the fragment shader is heavily loaded and may not be able to take on the fragment outputted by the rasterizer at the current clock cycle to perform fragment shading. While in one example the threshold between whether the fragment shader program is lightly or heavily loaded is based on whether the amount of data stored in shader input buffer 50 is less than or equal to half the capacity of shader input buffer 50, in other examples, the threshold between whether the fragment shader program is lightly or heavily loaded may be based on any other ratio between the amount of data stored in shader input buffer 50 and the capacity of shader input buffer 50. In other examples, the threshold between whether the fragment shader program is lightly or heavily loaded may be based on the amount of data stored in shader input buffer 50. For example, if the amount of data stored in shader input buffer comprises ten or fewer fragments, depth logic unit 54 may determine that the fragment shader program is lightly loaded. Conversely, if the amount of data stored in shader input buffer comprises more than ten fragments, depth logic unit 54 may determine that the fragment shader program is heavily loaded.

If the fragments outputted by the rasterizer are processed by depth test unit 48, GPU 12 may store the fragments resulting from processing by depth test unit 48 into shader input buffer 50. Such fragments resulting from processing by depth test unit 48 may include fewer fragments than the fragments outputted by the rasterizer because depth test unit 48 may discard one or more of the fragments as being occluded from view in the finally rendered scene. If the fragments outputted by the rasterizer are not processed by depth test unit 48, GPU 12 may store the fragments as outputted by the rasterizer in shader input buffer 50 depending on whether depth logic unit 54 has determined that the fragment shader is lightly loaded or heavily loaded. GPU 12 may store fragments into shader input buffer 50 to queue those fragments for fragment shading by a fragment shader that executes on processor cluster 46. As such, the fragment shader processing one or more fragments may include GPU 12 storing said one or more fragments into shader input buffer 50.

Figure 7:
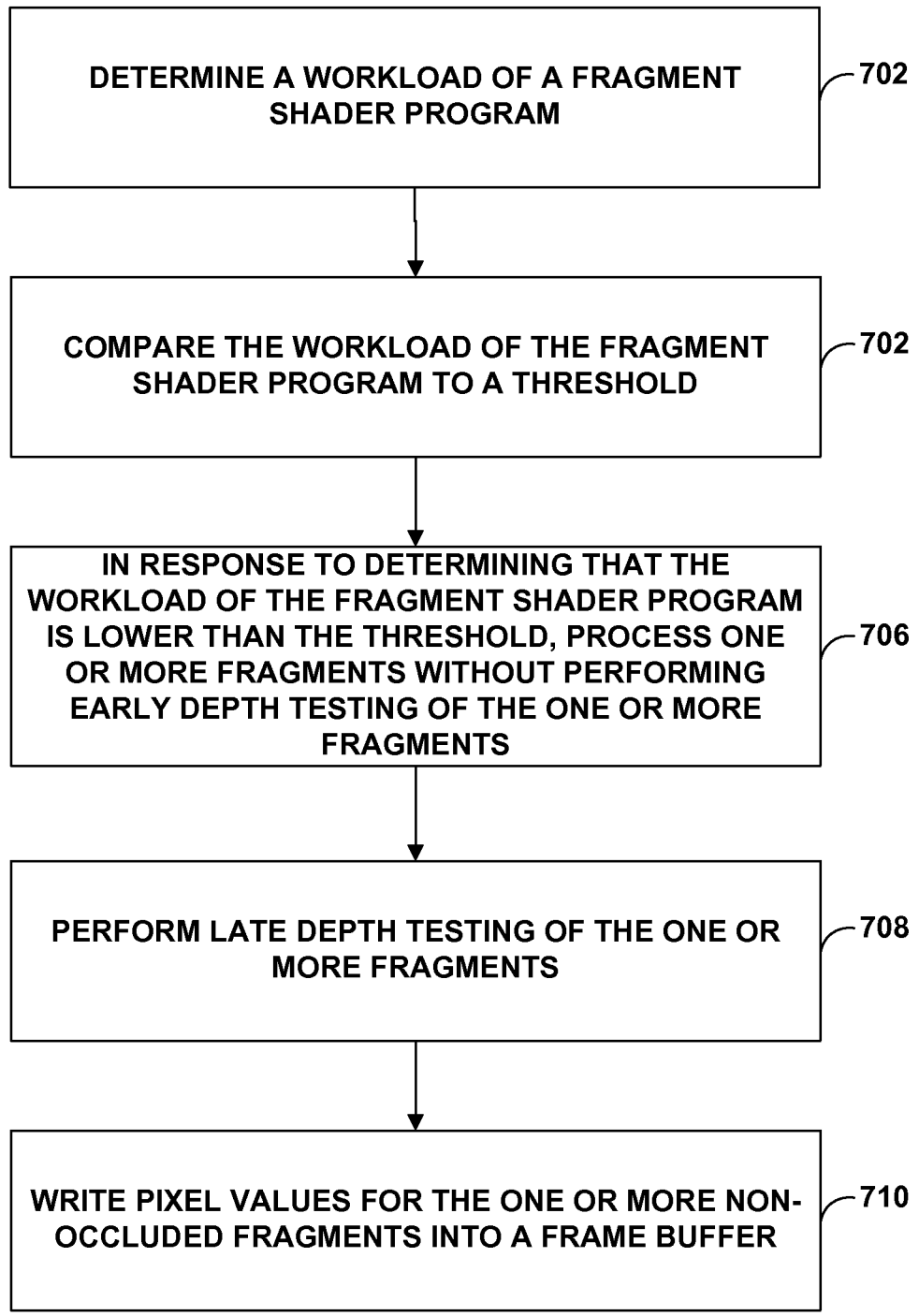
FIG. 7 is a flowchart illustrating an example process for dynamically switching between late depth processing and conservative depth processing.

FIG. 7 is a flowchart illustrating an example process for dynamically switching between late depth processing and conservative depth processing. As shown in FIG. 7, the process may include determining, by GPU 12, a workload of a fragment shader program that executes on GPU 12 (702). The process may further include comparing, by GPU 12, the workload of the fragment shader program to a threshold (704). The process may further include in response to determining that the workload of the fragment shader program is lower than the threshold, processing, by the fragment shader program, one or more fragments without performing, by GPU 12, early depth testing of the one or more fragments before the processing by the fragment shader program (706). The process may further include performing, by GPU 12 after processing by the fragment shader program, late depth testing of the one or more fragments to result in one or more non-occluded fragments (708). The process may further include writing, by GPU 12, pixel values for the one or more non-occluded fragments into frame buffer 16.

In some examples, determining the workload of the fragment shader program is in response to determining, by GPU 12, that a second one or more fragments outputted by the fragment shader program is available as input for GPU 12 to perform depth testing on the second one or more fragments. In some examples, the process further includes determining, by GPU 12 for each transaction of one or more fragments generated by a rasterizer of GPU 12, whether to perform early depth testing of the respective one or more fragments generated by the rasterizer of GPU 12.

In some examples, the process further includes in response to determining that the workload of the fragment shader program is higher than the threshold, re-determining a subsequent workload of the fragment shader program at a subsequent clock cycle, and in response to re-determining that the subsequent workload of the fragment shader program is lower than the threshold, processing, by the fragment shader program, the one or more fragments without performing, by GPU 12, early depth testing of the one or more fragments.

In some examples, the process further includes in response to a rasterizer of GPU 12 outputting a second one or more fragments to be processed by the fragment shader program, determining, by GPU 12 at a subsequent clock cycle, whether to perform early depth testing of a second one or more fragments based at least in part on whether a third one or more fragments outputted by the fragment shader program are available as input for GPU 12 to perform depth testing on the third one or more pixels. In some examples, the process further includes in response to determining that the third one or more fragments are not available as input for GPU 12 to perform depth testing on the third one or more fragments, performing, by GPU 12, depth testing on the second one or more fragments. In some examples, the process further includes processing, by the fragment shader program, a fourth one or more fragments resulting from performing depth testing on the second one or more fragments. In some examples, the process further includes performing, by GPU 12, late depth testing of the fourth one or more fragments.

In some examples, determining the workload of the fragment shader program is based at least in part on an amount of data stored in shader input buffer 50 for the fragment shader. In some examples, determining that the workload of the fragment shader program is lower than the threshold comprises determining that the amount of data stored in shader input buffer 50 is no more than half of a capacity of shader input buffer 50.

In some examples, the process further includes in response to a rasterizer of GPU 12 outputting a second one or more fragments to be processed by the fragment shader program at a subsequent clock cycle, re-determining, by GPU 12, the workload of the fragment shader program at the subsequent clock cycle. In some examples, the process further includes in response to the re-determined workload of the fragment shader program at the subsequent clock cycle being higher than the specified threshold, performing, by GPU 12, early depth processing of the second one or more fragments prior to processing of the second one or more fragments by the fragment shader program.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" and "processing unit," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware. Various examples have been described. These and other examples are within the scope of the following claims.

The invention claimed is:

1. A method of graphics processing comprising:
   determining, by a graphics processing unit (GPU), a workload of a fragment shader program that executes on the GPU based at least in part on an amount of data stored in an input buffer for the fragment shader program;
   comparing, by the GPU, the workload of the fragment shader program to a threshold;
   in response to determining that the workload of the fragment shader is lower than the threshold, processing, by the fragment shader program, one or more fragments without performing early depth testing of the one or more fragments before the processing by the fragment shader program;
   performing, by the GPU after processing by the fragment shader program, late depth testing of the one or more fragments to result in one or more non-occluded fragments; and
   writing, by the GPU, pixel values for the one or more non-occluded fragments into a frame buffer.

2. The method of claim 1, further comprising:
   determining the workload of the fragment shader program in response to determining, by the GPU, that a second one or more fragments output by the fragment shader program is available for the GPU to perform depth testing on the second one or more fragments.

3. The method of claim 1, further comprising:
determining, by the GPU for each transaction of one or more fragments generated by a rasterizer of the GPU, whether to perform early depth testing of the respective one or more fragments generated by the rasterizer of the GPU.

4. The method of claim 1, further comprising:
in response to determining that the workload of the fragment shader program is higher than the threshold, re-determining a subsequent workload of the fragment shader program at a subsequent clock cycle; and
in response to re-determining that the subsequent workload of the fragment shader program is lower than the threshold, processing, by the fragment shader program, the one or more fragments without performing, by the GPU, early depth testing of the one or more fragments.

5. The method of claim 1, further comprising:
outputting, by a rasterizer of the GPU, a second one or more fragments to be processed by the fragment shader program;
in response to the rasterizer of the GPU outputting the second one or more fragments to be processed by the fragment shader program, determining, by the GPU at a subsequent clock cycle, whether to perform early depth testing of the second one or more fragments based at least in part on whether a third one or more fragments outputted by the fragment shader program are available as input for the GPU to perform depth testing on the third one or more fragments;
determining, by the GPU, that the third one or more fragments are not available as input for the GPU to perform depth testing on the third one or more fragments;
in response to determining that the third one or more fragments are not available as input for the GPU to perform depth testing on the third one or more fragments, performing, by the GPU, early depth testing on the second one or more fragments;
processing, by the fragment shader program, a fourth one or more fragments resulting from performing early depth testing on the second one or more fragments; and
performing, by the GPU, late depth testing of the fourth one or more fragments.

6. The method of claim 1, wherein determining that the workload of the fragment shader program is lower than the threshold comprises:
determining that the amount of data stored in the input buffer is no more than half of a capacity of the input buffer.

7. The method of claim 1, further comprising:
outputting, by a rasterizer of the GPU at a subsequent clock cycle, a second one or more fragments to be processed by the fragment shader program;
in response to the rasterizer of the GPU outputting the second one or more fragments to be processed by the fragment shader program at the subsequent clock cycle, re-determining, by the GPU, the workload of the fragment shader program at the subsequent clock cycle;
in response to the re-determined workload of the fragment shader program at the subsequent clock cycle being higher than the threshold, performing, by the GPU, early depth testing of the second one or more fragments prior to processing of the second one or more fragments by the fragment shader program.

8. An apparatus configured to process graphics data comprising:
a memory that stores one or more fragments; and
a graphics processing unit (GPU) configured to:
determine a workload of a fragment shader program that executes on the GPU based at least in part on an amount of data stored in an input buffer for the fragment shader program;
compare the workload of the fragment shader program to a threshold;
in response to determining that the workload of the fragment shader program is lower than the threshold, process, by the fragment shader program, the one or more fragments without performing, by the GPU, early depth testing of the one or more fragments before the processing by the fragment shader program;
perform, after processing by the fragment shader program, late depth testing of the one or more fragments to result in one or more non-occluded fragments; and
write pixel values for the one or more non-occluded fragments into a frame buffer.

9. The apparatus of claim 8, wherein the GPU is further configured to:
determine the workload of the fragment shader program in response to determining that a second one or more fragments output by the fragment shader program is available for the GPU to perform depth testing on the second one or more fragments.

10. The apparatus of claim 8, wherein the GPU is further configured to:
determine, for each transaction of one or more fragments generated by a rasterizer of the GPU, whether to perform early depth testing of the respective one or more fragments generated by the rasterizer of the GPU.

11. The apparatus of claim 8, wherein the GPU is further configured to:
in response to determining that the workload of the fragment shader program is higher than the threshold, re-determine a subsequent workload of the fragment shader program at a subsequent clock cycle; and
in response to re-determining that the subsequent workload of the fragment shader program is lower than the threshold, process, by the fragment shader program, the one or more fragments without performing, by the GPU, early depth testing of the one or more fragments.

12. The apparatus of claim 8, wherein the GPU is further configured to:
output, by a rasterizer of the GPU, a second one or more fragments to be processed by the fragment shader program;
in response to the rasterizer of the GPU outputting the second one or more fragments to be processed by the fragment shader program, determine, at a subsequent clock cycle, whether to perform early depth testing of the second one or more fragments based at least in part on whether a third one or more fragments outputted by the fragment shader program are available as input for the GPU to perform depth testing on the third one or more fragments;
determine that the third one or more fragments are not available as input for the GPU to perform depth testing on the third one or more fragments;
in response to determining that the third one or more fragments are not available as input for the GPU to perform depth testing on the third one or more fragments, perform early depth testing on the second one or more fragments;

process, by the fragment shader program, a fourth one or more fragments resulting from performing early depth testing on the second one or more fragments; and perform late depth testing of the fourth one or more fragments subsequent to the fragment shader program processing the fourth one or more fragments.

13. The apparatus of claim 8, wherein the GPU is further configured to:
determine that the amount of data stored in the input buffer is no more than half of a capacity of the input buffer.

14. The apparatus of claim 8, wherein the GPU is further configured to:
output, by a rasterizer of the GPU at a subsequent clock cycle, a second one or more fragments to be processed by the fragment shader program;
in response to the rasterizer of the GPU outputting the second one or more fragments to be processed by the fragment shader program at the subsequent clock cycle, re-determine the workload of the fragment shader program at the subsequent clock cycle; and
in response to the re-determined workload of the fragment shader program at the subsequent clock cycle being higher than the specified threshold, perform early depth testing of the second one or more fragments prior to processing of the second one or more fragments by the fragment shader program.

15. An apparatus comprising:
means determining a workload of a fragment shader program that executes on a graphics processing unit (GPU) based at least in part on an amount of data stored in an input buffer for the fragment shader program;
means for comparing the workload of the fragment shader program to a threshold;
means for, in response to determining that the workload of the fragment shader program is lower than the threshold, processing one or more fragments without performing early depth testing of the one or more fragments before the processing by the fragment shader program;
means for performing, after processing by the fragment shader program, late depth testing of the one or more fragments to result in one or more non-occluded fragments; and
means for writing pixel values for the one or more non-occluded fragments into a frame buffer.

16. The apparatus of claim 15, further comprising:
means for determining the workload of the fragment shader program in response to determining that a second one or more fragments outputted by the fragment shader program is available to perform depth testing on the second one or more fragments.

17. The apparatus of claim 15, further comprising:
means for determining, for each transaction of one or more fragments generated by a rasterizer of the GPU, whether to perform early depth testing of the respective one or more fragments generated by the rasterizer of the GPU.

18. The apparatus of claim 15, further comprising:
means for, in response to determining that the workload of the fragment shader program is higher than the threshold, re-determining a subsequent workload of the fragment shader program at a subsequent clock cycle; and
means for, in response to re-determining that the subsequent workload of the fragment shader program is lower than the threshold, processing, by the fragment shader program, the one or more fragments without performing early depth testing of the one or more fragments.

19. The apparatus of claim 15, further comprising:
means for outputting a second one or more fragments to be processed by the fragment shader program;
means for, in response to outputting the second one or more fragments to be processed by the fragment shader program, determining, at a subsequent clock cycle, whether to perform early depth testing of the second one or more fragments based at least in part on whether a third one or more fragments outputted by the fragment shader program are available to perform depth testing on the third one or more fragments;
means for determining that the third one or more fragments are not available as input to perform depth testing on the third one or more fragments;
means for, in response to determining that the third one or more fragments are not available to perform depth testing on the third one or more fragments, performing early depth testing on the second one or more fragments;
means for processing a fourth one or more fragments resulting from performing early depth testing on the second one or more fragments; and
means for performing late depth testing of the fourth one or more fragments.

20. The apparatus of claim 15, wherein the means for determining that the workload of the fragment shader program is lower than the specified threshold comprises:
means for determining that the amount of data stored in the input buffer is no more than half of a capacity of the input buffer.

21. A non-transitory computer-readable storage medium storing instructions that, when executed, cause one or more programmable processors to:
determine a workload of a fragment shader program that executes on the one or more programmable processors based at least in part on an amount of data stored in an input buffer for the fragment shader program;
compare the workload of the fragment shader program to a threshold;
in response to determining that the workload of the fragment shader program is lower than the threshold, process, by the fragment shader program, one or more fragments without performing, by the one or more programmable processors, early depth testing of the one or more fragments before the processing by the fragment shader program;
perform, after processing by the fragment shader program, late depth testing of the one or more fragments to result in one or more non-occluded fragments; and
writing pixel values for the one or more non-occluded fragments into a frame buffer.

22. The non-transitory computer-readable storage medium of claim 21, wherein the instructions, when executed, further cause the one or more programmable processors to:
determine the workload of the fragment shader program in response to determining, by the one or more programmable processors, that a second one or more fragments output by the fragment shader program is available for the one or more programmable processors to perform depth testing on the second one or more fragments.

23. The non-transitory computer-readable storage medium of claim 21, wherein the instructions, when executed, further cause the one or more programmable processors to:
  determine, for each transaction of one or more fragments generated by a rasterizer, whether to perform early depth testing of the respective one or more fragments generated by the rasterizer.

24. The non-transitory computer-readable storage medium of claim 21, wherein the instructions, when executed, further cause the one or more programmable processors to:
  in response to determining that the workload of the fragment shader program is higher than the threshold, re-determine a subsequent workload of the fragment shader program at a subsequent clock cycle; and
  in response to re-determining that the subsequent workload of the fragment shader program is lower than the threshold, process, by the fragment shader program, the one or more fragments without performing, by the one or more programmable processors, early depth testing of the one or more fragments.

25. The non-transitory computer-readable storage medium of claim 21, wherein the instructions, when executed, further cause the one or more programmable processors to:
  output, by a rasterizer of the one or more programmable processors, a second one or more fragments to be processed by the fragment shader program;
  in response to the rasterizer of the one or more programmable processors outputting the second one or more fragments to be processed by the fragment shader program, determine, at a subsequent clock cycle, whether to perform early depth testing of the second one or more fragments based at least in part on whether a third one or more fragments outputted by the fragment shader program are available as input for the one or more programmable processors to perform depth testing on the third one or more fragments;
  determine that the third one or more fragments are not available as input for the one or more programmable processors to perform depth testing on the third one or more fragments;
  in response to determining that the third one or more fragments are not available as input for the one or more programmable processors to perform depth testing on the third one or more fragments, perform early depth testing on the second one or more fragments;
  process, by the fragment shader program, a fourth one or more fragments resulting from performing early depth testing on the second one or more fragments; and
  perform late depth testing of the fourth one or more fragments subsequent to the fragment shader program processing the fourth one or more fragments.

26. The non-transitory computer-readable storage medium of claim 21, wherein determine that the workload of the fragment shader program is lower than the specified threshold comprises:
  determine that the amount of data stored in the input buffer is no more than half of a capacity of the input buffer.

* * * * *